United States Patent
Yorita et al.

[11] Patent Number: 5,855,781
[45] Date of Patent: Jan. 5, 1999

[54] MONOLITHIC CERAMIC FILTER

[75] Inventors: Hiroshi Yorita, Toyoake; Hisatomi Taguchi, Aichi-gun; Yuji Kamei, Nagoya, all of Japan

[73] Assignee: Noritake Co., Ltd., Nagoya, Japan

[21] Appl. No.: 855,034

[22] Filed: May 13, 1997

Related U.S. Application Data

[63] Continuation of Ser. No. 094,904, Jul. 22, 1993, abandoned.

[30] Foreign Application Priority Data

| Jul. 23, 1992 | [JP] | Japan | 4-216575 |
| Sep. 21, 1992 | [JP] | Japan | 4-274807 |

[51] Int. Cl.$^6$ .................................................. B01D 63/00
[52] U.S. Cl. ............... 210/321.82; 210/247; 210/321.89; 210/486; 210/496; 210/510.1; 55/523; 55/DIG. 30; 422/180; 502/527.18; 502/527.19
[58] Field of Search ................................ 210/247, 483, 210/496, 510.1, 321.82, 321.89, 486, 433.2, 456, 652; 422/177, 180; 55/523, DIG. 30; 502/527.18, 527.19

[56] References Cited

U.S. PATENT DOCUMENTS

| 3,712,473 | 1/1973 | Ellenburg | 210/496 |
| 3,737,043 | 6/1973 | Clark | 210/496 |
| 4,069,157 | 1/1978 | Hoover et al. | 210/321.82 |
| 4,416,676 | 11/1983 | Montierth . | |
| 4,420,316 | 12/1983 | Frost et al. . | |
| 4,781,831 | 11/1988 | Goldsmith | 210/247 |
| 5,009,781 | 4/1991 | Goldsmith | 210/321.89 |
| 5,064,586 | 11/1991 | Higashijima | 264/177.11 |
| 5,108,601 | 4/1992 | Goldsmith | 210/247 |
| 5,149,475 | 9/1992 | Horikawa et al. | 264/177.11 |
| 5,454,947 | 10/1995 | Olapinski et al. | 210/510.1 |

FOREIGN PATENT DOCUMENTS

| 1-501534 | 6/1989 | Japan . |
| 3-500386 | 1/1991 | Japan . |
| WO 88/07398 | 10/1988 | WIPO . |
| WO 90/03831 | 4/1990 | WIPO . |

*Primary Examiner*—Robert J. Popovics
*Attorney, Agent, or Firm*—Morrison & Foerster

[57] ABSTRACT

A monolithic ceramic filter having a portion of the partition wall of a honeycomb structure exposed with its end face on an outer wall surface of the structure and increased in thickness as compared to the remaining portion of the partition wall to form a flow resistance relaxing portion is disclosed. The monolithic ceramic filter may also have a groove-shaped recess which is separated via a partition from a liquid supply passage of a honeycomb structure and is in communication with the outside of the structure. The flow resistance of the filtrate within the partition walls may be diminished to enable efficient filtration. The filter is produced simply by extrusion molding. There is no necessity of forming holes for discharging the filtrate in some cases.

11 Claims, 10 Drawing Sheets

MONOLITHIC CERAMIC FILTER

This application is a continuation of application Ser. No. 08/094,904, filed Jul. 22, 1993, now abandoned.

FIELD OF THE INVENTION

This invention relates to a monolithic ceramic filter which has a honeycomb structure capable of achieving a high filtration area and a low filtration resistance and which may be employed for microfiltration, ultrafiltration and reverse osmosis.

BACKGROUND

Heretofore, a number of researches have been conducted for achieving a compact ceramic filter with a high filtration area, and proposals have been made of monolithic ceramic filters having a honeycomb structure.

With the monolithic ceramic filters, the filtrate produced on filtration by a filtration membrane formed on the surface of the supply liquid passages flows within the partition walls towards an outer wall of the filter before being discharged out of the filter at the outer wall of the filter. Thus the flow volume of the filtrate within the partition wall becomes larger as the outer wall is approached.

With conventional ceramic filters, having the honeycomb structure, the partition wall has a constant wall thickness. Consequently, the flow rate of the filtrate within the partition wall is increased significantly at a region close to the outer wall, so that the flow resistance to the filtrate is increased significantly to limit the speed of filtration. Consequently, a ceramic filter having a larger filtration area has been difficult to put into practice on the industrial scale.

As solutions to this problem, crossflow ceramic filters having filtrate conduits as disclosed in JP Patent KOHYO Publication (National laying-open of PCT international application) Nos. 01-501534 (WO 88/07398) or 03-500386 (WO 90/03831), have been proposed.

SUMMARY OF THE INVENTION

Problem to be Solved by the Invention

The above-mentioned ceramic filters having filtrate conduits are complicated in structure and are in need of highly complex manufacture techniques. For instance, these ceramic filters require either additional complicated processing and machining on a monolith honeycomb structure, or complicated work for assembling a number of honeycomb members (slabs), in order to produce flow out channels of the filtrate.

Objects of the Invention

It is an object of the present invention to provide a ceramic filter of a high filtration area which is free of the above-mentioned problems and with which it becomes possible to inhibit increase in the flow resistance to the filtrate within the partition wall without limitation imposed on the filtration speed.

Other objects will become apparent from the entire dislosure.

According to the first aspect of the present invention, the above object may be achieved by a monolithic ceramic filter, wherein a portion of partition wall of a honeycomb structure of the filter has its end face exposed on an outer wall surface of the honeycomb structure and has an increased thickness as compared to the remaining portion of the partition wall to constitute a flow resistance relaxing portion. It is most advantageous that this monolithic ceramic filter be produced simply by the extrusion technology.

According to the second aspect of the present invention, the flow resistance relaxing portion (i.e., thick wall portion) has a filtrate discharging conduit opening reaching an outer wall surface of the honeycomb structure. According to the second aspect the production is also simple and easy since the filtrate discharging conduit openings can be produced within the thick wall portion additional to the first aspect.

With such flow resistance relaxing portion, the flow resistance offered to the filtrate may be prevented from being increased.

Besides, with the above-mentioned filtrate discharging conduit opening, the flow resistance imposed to the filtrate may be additionally prevented from being increased.

According to the third aspect of the present invention, the above object may be achieved by a monolithic ceramic filter defined as follows.

A monolithic ceramic filter comprising communication voids separated from cells of a honeycomb structure of the filter by cell partition walls, with the voids being in communication with the lateral outside of the honeycomb structure and continuously extending axially through the honeycomb structure.

According to the fourth aspect of the present invention, based on the monolithic ceramic filter by the third aspect, an end frame is fitted on the end of said ceramic filter, preferably on both the ends.

Preferably, the communication voids are groove-shaped recesses formed in the outer peripheral wall of the honeycomb structure.

Preferably, the ceramic filters are of such a shape as to permit production thereof by extrusion molding, which simplifies the production significantly.

Preferably, the end frames are each provided with protrusions engaged in the communication voids or the groove-shaped recesses to close the communication voids at the ends of the honeycomb structure.

The communication voids may extend from the inside of the honeycomb structure except the central part of the honeycomb structure in the transverse direction thereof. The communication voids may extend from the outer peripheral wall toward the inside, ending at an intermediate position. Also the communication voids may extend alternately from one side of the outer peripheral wall and from the opposite side thereof as viewed in the cross section of the honeycomb structure. This arrangement is possible particularly in the case where the honeycomb structure has a square-shaped cross section.

Further arrangement of the communication voids (groove-shaped recesses) or the flow resistance relaxing portions are exemplified in FIGS. 8 to 9.

Concept Underlying the Invention

Although the honeycomb type filter is effective as a ceramic filter having a high filtration area, the filtration speed is limited due to the significantly increased flow resistance presented to the filtrate, with the consequence that it is difficult to utilize the honeycomb ceramic filter of a high filtration area on an industrial scale. The present invention provides a monolithic ceramic filter having a high filtration area in which limitations on the filtration speed are resolved by preventing increase in the flow resistance imposed on the filtrate.

The flow resistance offered to the filtrate within the partition wall (pressure loss $\Delta P$) is represented by Kozeny-Carmen's formula $$\frac{Q}{A} = \frac{\epsilon^3 \Delta P}{\kappa L \mu (1-\epsilon)^2 S^2} \quad (1)$$

Since $$D = \frac{4\epsilon}{(1-\epsilon)S} \quad (2)$$

the following formula (3)

$$\frac{Q}{A} = \frac{\epsilon D^2 \Delta P}{16\kappa L \mu} \quad (3)$$

holds. In the above formulas (1) to (3), Q denotes the flow volume, A the cross-sectional area, ε the pore ratio, ΔP pressure loss, κ a constant, L a distance, μ the viscosity, S the surface area and D the pore diameter.

The above formula demonstrates that the flow resistance to the filtrate may be diminished such as by increasing the cross-sectional area A, increasing the pore diameter D, decreasing the distance L or by increasing the pore ratio ε. The present invention has been accomplished on the basis of the above finding.

According to the first aspect of the present invention, as shown in FIGS. 1 to 3, the cross-sectional area A is increased by having a thick wall portion (12), increased in thickness, of a partition wall connecting to an outer wall (13) so as to serve as a filtrate passage (flow resistance relaxing portion), whereas according to the second aspect, the distance L is decreased by the filtrate discharging conduit opening (14) connecting to the outer wall surface.

According to the third aspect of the present invention, by providing communication voids separated from the cells of the honeycomb structure by means of partition walls (cell partition walls) for communication with the outside of the honeycomb structure, the flow distance L which is traversed by the filtrate resulting from filtration through the filtration membrane before the filtrate is discharged out of an outer wall of the filter after flowing through the inside of the partition walls is diminished. In this manner, a monolithic ceramic filter is realized in which the flow resistance presented to the filtrate is suppressed to a smaller value and in which limitation imposed on the filtration speed has been significantly eliminated.

DETAILED DESCRIPTION OF THE PREFERRED EMBODIMENTS

Throughout all the aspects, the shape which permits production of the filter by extrusion molding may be exemplified by a shape such that a number of thick wall portions or voids are formed uninterruptedly from one to the other end face of the honeycomb structure in the same direction as the direction of extrusion of the open cells of the honeycomb structure.

As regards the second aspect, the discharging conduit openings could be formed axially of the honeycomb structure within the thick wall portions, which allows advantageous extrusion molding. However, this arrangement would require additional measures at both the ends for separating the filtrate from the in and out flow fluids. Throughout the first to fourth aspects, the filtrate can be discharged laterally out of the outer peripheral wall, and the separating conduits for the filtrate at both the honeycomb ends is either dispensed of or significantly simplified.

Figure 1:
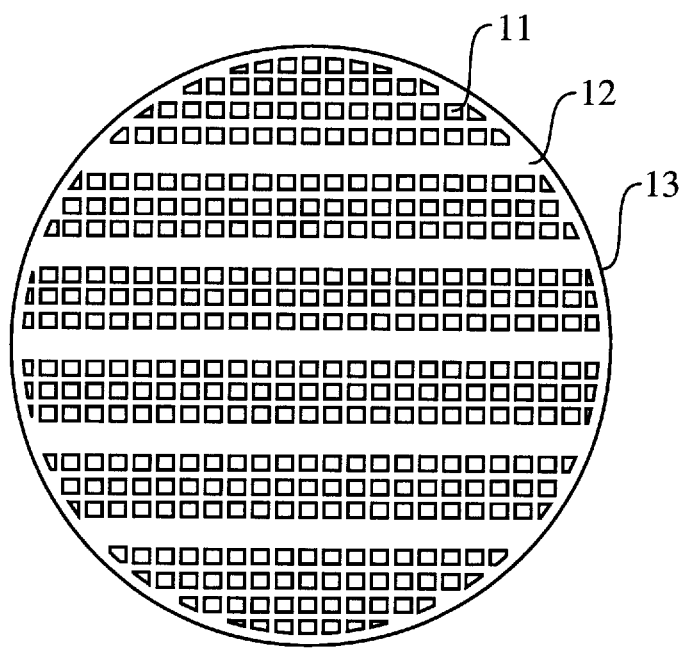
FIG. 1 is a side elevational view showing a supporting member of a honeycomb structure according to Example 1 of the present invention.

With the monolithic ceramic filter according to the first aspect of the present invention, a part of the partition wall of the honeycomb structure is thickened and designed as a flow resistance relaxing portion. For instance, the thickened walls can be arranged at an interval of a certain number of cells. A simple example is a parallel arrangement as shown in FIG. 1. In FIG. 1 additional thick walls may be disposed across (e.g., vertically) the horizontal thick walls.

The flow resistance relaxing portion comprises a portion of partition wall of the honeycomb structure, which portion has a thickness larger than that of the remaining portion of the partition wall and has its end face exposed in the outer (lateral) wall surface of the honeycomb structure. Preferably, the partition wall of the flow resistance relaxing portion has a thickness two to five times that of the remaining portion of the partition wall.

It is noted that, if the thickness is less than doubled, the effects of the flow resistance relaxing portion would be lowered, whereas, if the thickness is more than five times, the filtration area is decreased, to lower the entire filtration capacity of the filter.

Figure 10:
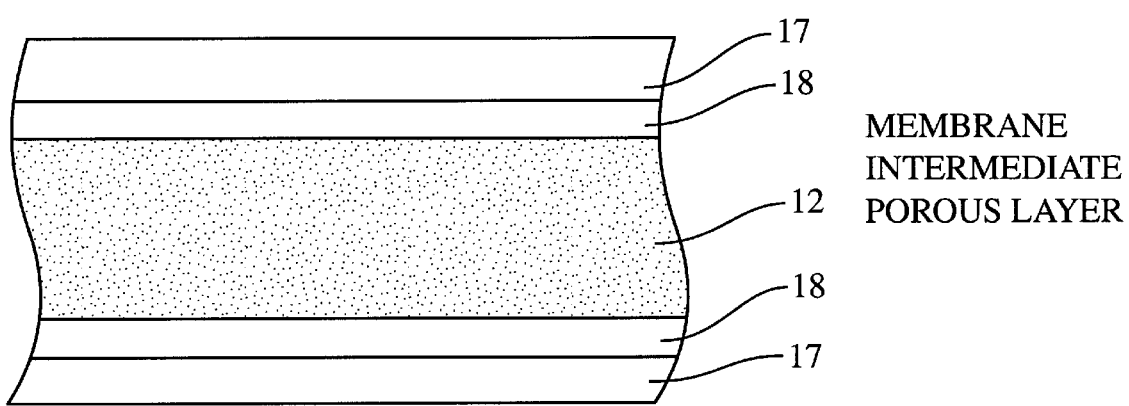
FIG. 10 is a cross-sectional view of a honeycomb structure.

With reference to FIG. 10, it is preferred that the honeycomb structure comprises a supporting member or substrate of the honeycomb structure 12, formed of porous ceramics having a mean pore diameter preferably in a range of from 1 μm to 100 μm, more preferably in a range of 5 μm to 20 μm, and a filtration membrane 17, (preferably of porous ceramics) with a mean pore diameter in a range of from 5 nm to 5 μm, formed on the above-mentioned supporting member. The filtration membrane may be of any suitable material other than ceramics as a filtration membrane.

The honeycomb structure may also comprise an intermediate layer 18 formed between the supporting member of the honeycomb structure and the filtration membrane. This optional intermediate layer has a mean pore diameter intermediate between the mean pore diameter of the supporting member and that of the filtration membrane. However, the supporting member for the honeycomb structure devoid of the filtration membrane also suffices, depending on the desired filtration accuracy.

The following is a typical method or producing the supporting member for the honeycomb structure.

The ceramic starting material having a suitable particle diameter is mixed with an organic binder and water, and the resulting mixture is kneaded and extruded to a body having plastic moldability. Sintering aids such as clay, glass etc. may also be added as inorganic binders, if desired. The body is further extrusion molded by an extrusion molding machine having a predetermined die lip. The molded product is dried and sintered to complete a supporting member, that is, a honeycomb skelton.

According to the second aspect filtrate discharging conduit openings (14) which open in the outer peripheral surface, preferably after drying, are formed at a predetermined pitch. The conduit openings (14) are disposed, preferably at right angles to the honeycomb axis for a better distribution and ease in manufacture.

Figure 5:
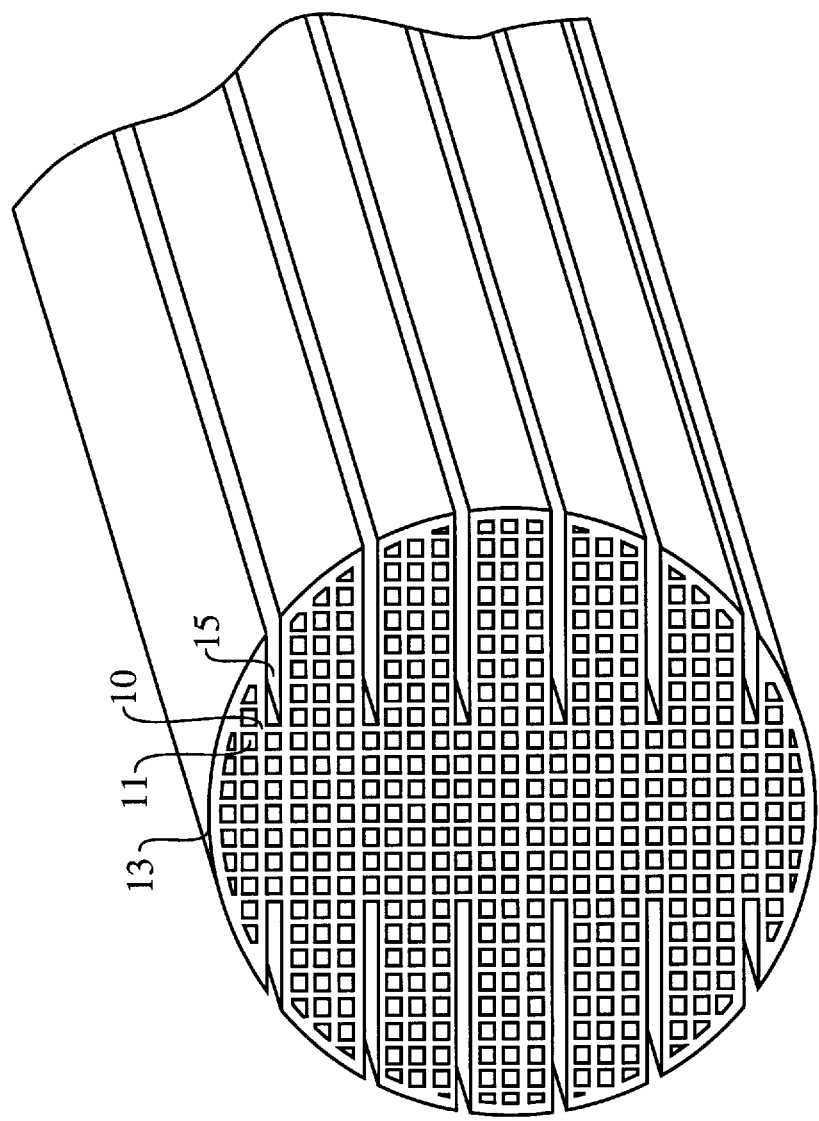
FIG. 5 is a perspective view showing a supporting member of a honeycomb structure according to Example 3 of the present invention.
Figure 7:
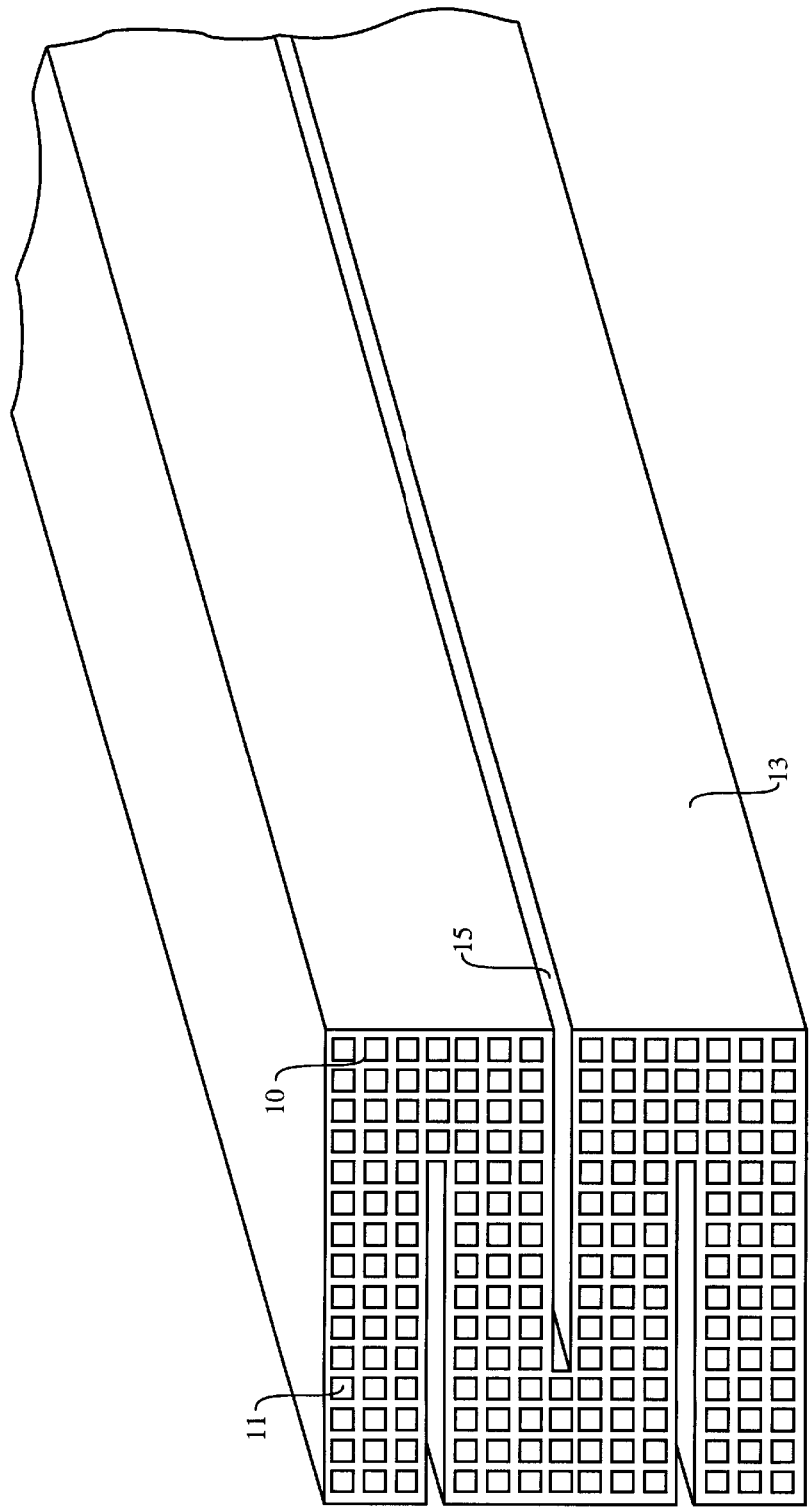
FIG. 7 is a perspective view showing a honeycomb supporting member according to a modified embodiment.

According to the third aspect, a green molded product is extrusion molded by an extrusion molding machine having a corresponding die lip. This produces a supporting member of a honeycomb structure having groove-shaped peripheral recesses (15) on the outer periphery (FIGS. 5 and 7).

The porous ceramics may be of any material such as alumina, silica, zirconia, mullite, spinel, cordierite, carbon, silicon carbide, silicon nitride or the like.

On the surface of a raw fluid supply passage (11) of a supporting member having a honeycomb structure shown in FIGS. 1, 3 or FIGS. 5, 7, a filtration membrane formed of porous ceramics having a mean pore size of 5 nm to 5 $\mu$m is formed to produce a ceramic filter. The following is a typical method for producing such filtration membrane.

To a ceramic starting material in the form of powders or colloidal solution, having a suitable particle size, a solvent such as water, an organic binder, deflocculating agent, a pH adjustment agent, etc. are added and mixed together to produce a slip. This slip is coated on the surfaces of raw fluid supply passages (11) of a supporting member having a honeycomb structure. The resulting product is dried and sintered to produce a filtration membrane. The materials of the filtration membrane embrace alumina, zirconia, titania etc.

Figure 6:
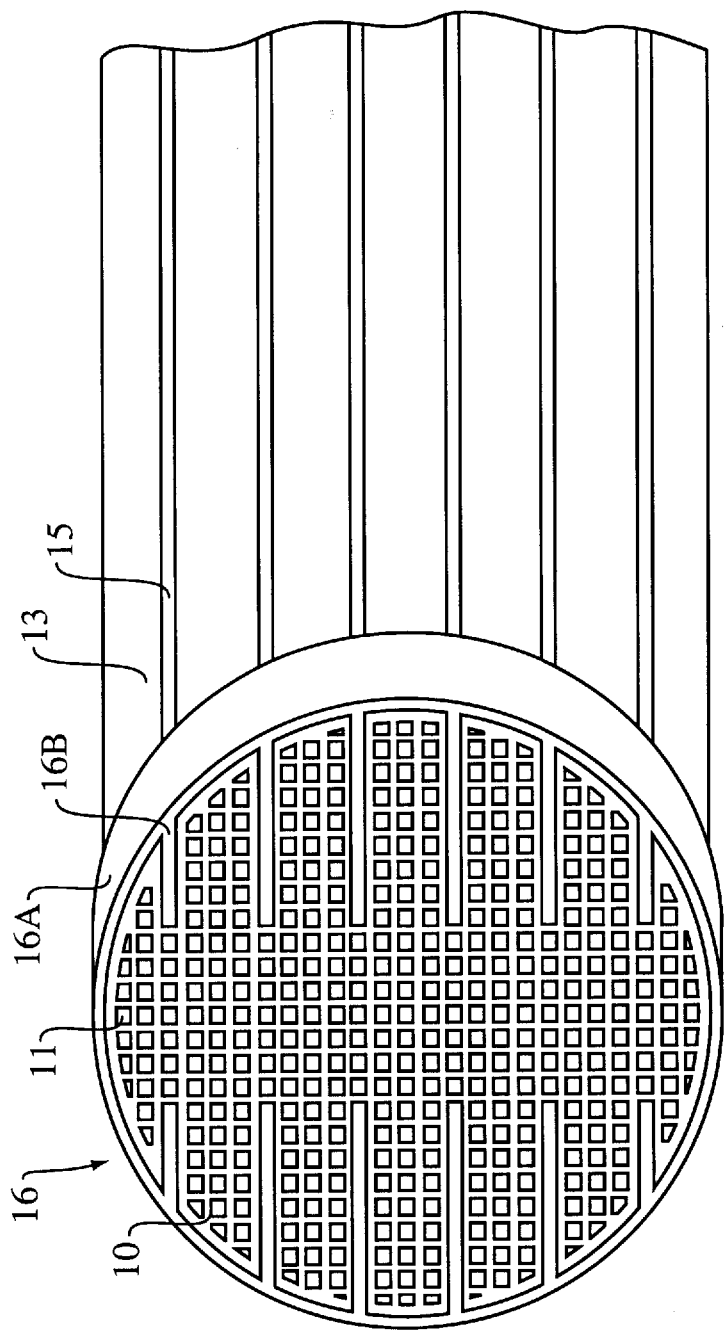
FIG. 6 is a perspective view showing the ceramic filter of Example 3 of the present invention, when fitted with end frames.

According to the fourth aspect, the ceramic filter, produced in this matter, is fitted on its both ends with end frames (16). As shown in FIG. 6, each end frame (16) preferably comprises a rim portion (16a) and a plurality of protrusions 16b arranged for stopping up the groove-shaped recesses of the ceramic filter at the honeycomb ends. The end frame (16) is formed of stainless steel, ceramics, resins or the like and sealed or fused by an organic or inorganic adhesive or glasses. By mounting the end frame (16) in this manner, it becomes possible to prevent a raw fluid from being mixed into a filtrate, as well as to facilitate setting of the ceramic filter on a housing, not shown. The frames can also serve to strengthen the ceramic honeycomb structure.

The ceramic filter may also be used under such a condition in which both ends of the groove-shaped recesses are sealed with an organic material, such as epoxy resin, or with an inorganic material, such as cement or glass sealing paste, thus without using the end frames. In addition, the ceramic filter may be used under such a condition in which end frame devoid of protrusions are affixed to the filter having both ends of the grooved recesses thereof sealed as described above.

Although the cross-sectional profile of each supply fluid passage (cell) is square in FIGS. 1 to 3, and FIGS. 5 to 7, it may also be other shapes of polygon such as triangle, hexagon etc. circle and others. Besides although the supply fluid passages (cells) are arranged in a pattern of square meshes at the honeycomb ends and assume an outer profile of circular or square shape, they may also be arranged in any other patterns, such as patterns of hexagons, concentric circles, etc. in which the thick wall portions and grooved recesses may be arranged radially.

Figure 8:
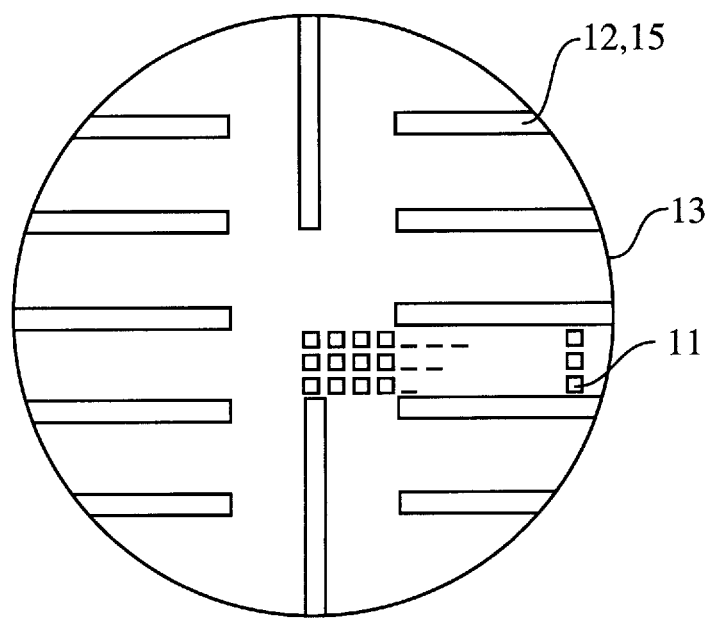
FIGS. 8 and 9 show further arrangements of flow resistance relaxing portions or communication voids as viewed in the cross section of the honeycomb structure.
Figure 9:
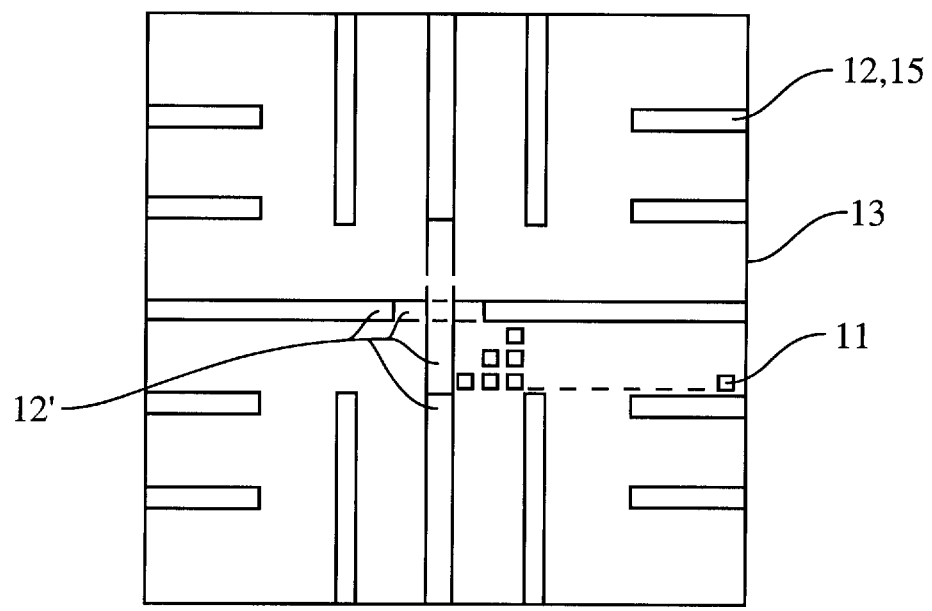

Further possible arrangements of the flow resistance relaxing portions (12) or communication voids (15) are illustrated in FIGS. 8 and 9, each for the square cells (11). FIG. 8 represents a round profile of outer wall 13, while FIG. 9 represents a square profile thereof. Although not illustrated, concentric arrangement of cells (11) is possible in which the flow resistance relaxing portions (12) or the communication voids (15) may be disposed radially. As is apparent from these figures, a combination of the flow resistance relaxing portion(s) (12') and the communication void(s) (15) is also possible. The former (12') is shown in FIG. 9 in an intersecting fashion. Such combination would serve to strengthen the honeycomb structure provided with the communication voids (15).

EXAMPLES

Example 1

First Aspect

To 100 parts by weight of alumina, having a mean particle size of 40 $\mu$m, 8 parts by weight of glass powders having a mean particle size of 5 $\mu$m as an inorganic binder, and 7 parts by weight of methyl cellulose as an organic binder, and a predetermined amount of water, were added and kneaded to form a plastic body for extrusion. Using an extrusion molding machine, having a die lip which will produce a cross-sectional shape as shown in FIG. 1, the body for extrusion was extrusion-molded and dried to a sufficiently dried supporting member. The resulting supporting member was sintered in a sintering furnace at 1250° C. to produce a supporting member having a honeycomb structure shown in FIG. 1. The supporting member had a diameter and a length of 150 mm and 1000 mm, respectively, a mean pore size of 10 $\mu$m, a thickness of partition wall of 2 mm, a thickness of a portion of the partition wall connecting to an outer wall thickened so as to be used as a filtrate passage (flow resistance relaxing portion) (12) of 8 mm, and a size of the supply liquid passage of the size of a side equal to 4 mm of a square.

100 parts by weight of fine alumina powders having a mean particle size of 0.6 $\mu$m, 75 parts by weight of water and 40 parts by weight of an organic binder (a water-soluble acrylic resin having a solid content of 30%) were charged into a container of a synthetic material and stirred and mixed with alumina pebbles for 24 hours in a ball mill to produce a slip for forming a filtration membrane. This slip for forming the filtration membrane was adsorbed to the surface of supply liquid passages of the supporting member of the honeycomb structure to form a (green) filtration membrane. The supporting member with the (green) filtration membrane thereon was then dried and sintered at 1250° C. The filtration membrane thus produced had a mean pore size of 0.2 $\mu$m.

The ceramic filter thus produced had a pure water transmission flow velocity at a differential pressure of 1 kg/cm$^2$ equal to 2.5 m$^3$/m$^2$ hr.

Example 2

Second Aspect

Figure 2:
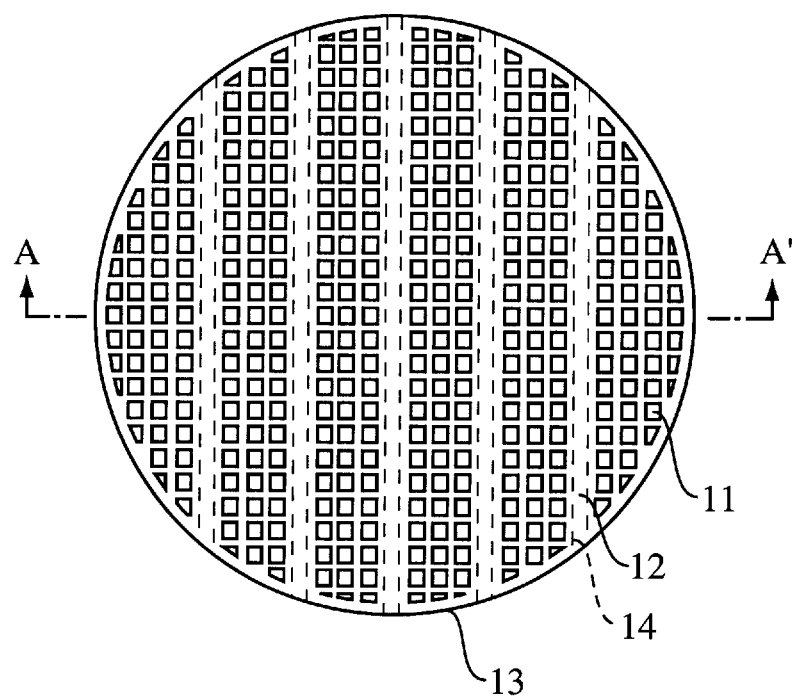
FIG. 2 is a side elevational view showing a supporting member of a honeycomb structure according to Example 2 of the present invention.
Figure 3:
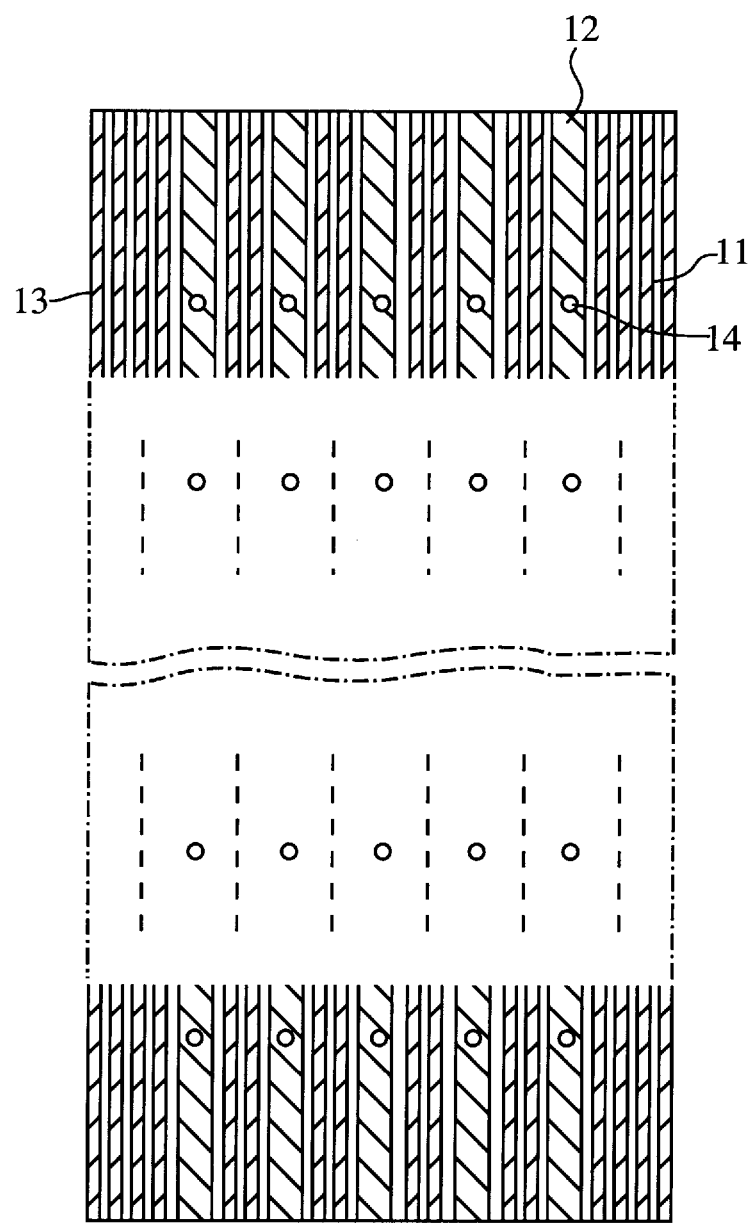
FIG. 3 is a cross-sectional view taken along line A–A' of FIG. 2.

As shown in FIGS. 2 and 3, a ceramic filter was produced in the same way as in Example 1, except that a plurality of conduit openings (through-holes) (14) for discharging the filtrate were formed transverse to the honeycomb structure in the flow resistance relaxing portions (12) of the supporting member of the honeycomb structure to reach the outer wall surface of the supporting member throughout the flow resistance relaxing portion. The conduit openings (14) for discharging the filtrate were 4 mm in diameter, while the distance between neighboring through-holes in the flow resistance relaxing portion was 10 cm in a parallel arrangement.

The ceramic filter thus produced had a pure water transmission flow velocity at a differential pressure of 1 kg/cm$^2$ equal to 2.7 m$^3$/m$^2$ hr.

Note, however, the conduit openings for discharging need not be a through-hole, but can be open at only one end thereof, while in this case, alternate arrangement of openings to right and left (or up and down) surfaces of the outer wall is preferred.

Comparative Example 1

Figure 4:
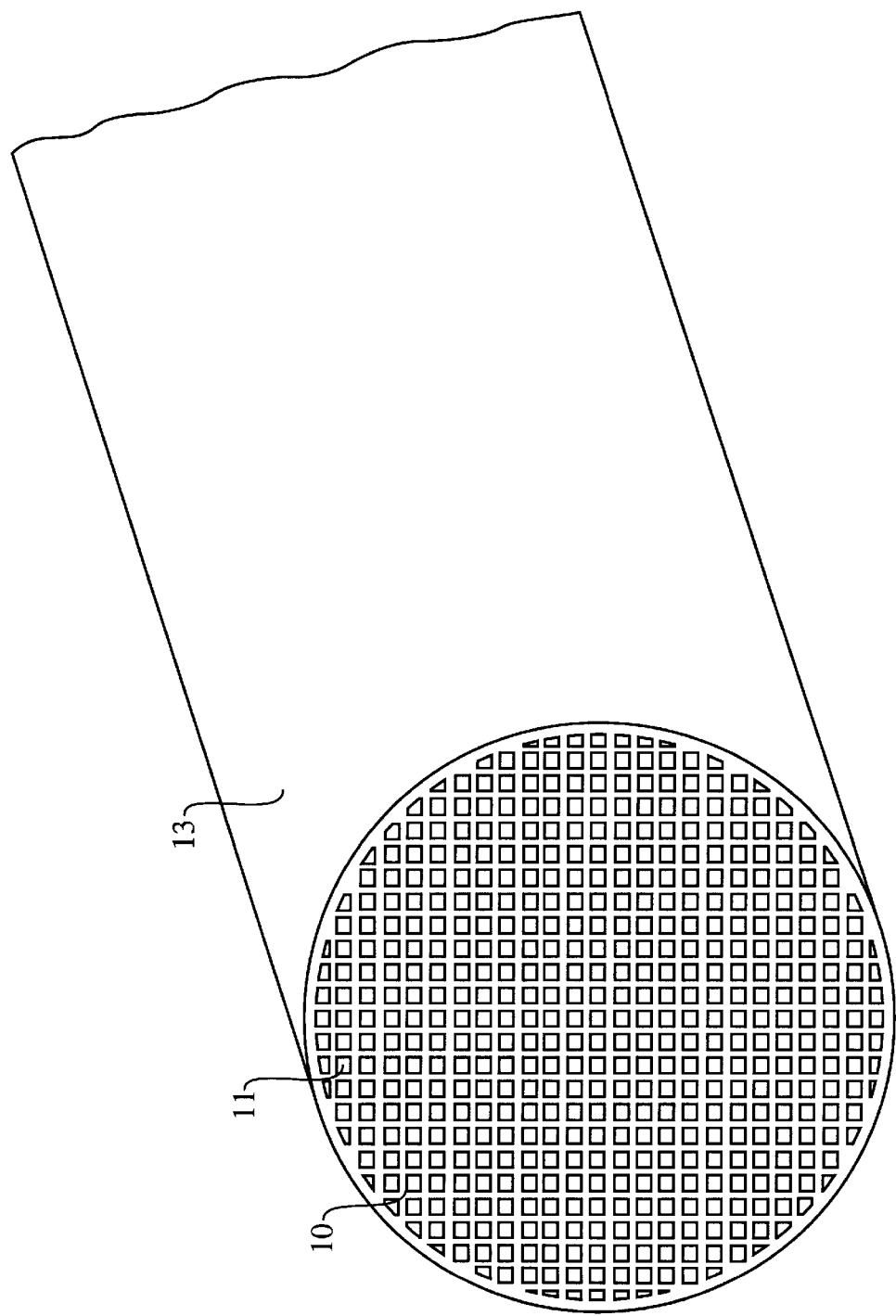
FIG. 4 is a perspective view of a supporting member of a honeycomb structure according to a comparative example.

As shown in FIG. 4, a ceramic filter was produced in the same way as in Example 1, except that the portion of the partition wall connecting to the outer wall which was thickened so as to be used as a filtrate passage (flow resistance relaxing portion) (12) was not formed in the supporting member having the honeycomb structure. The ceramic filter thus produced had a pure water transmission flow velocity at a differential pressure of 1 kg/cm$^2$ equal to 1.9 m$^3$/m$^2$ hr.

Examples 3
Third and Fourth Aspects

Using a die lip having a corresponding cross-section, a supporting member of a honeycomb structure as shown in FIG. 5 having a cross section with the groove-shaped peripheral recess 15 formed in the outer peripheral wall was produced otherwise in the same manner as in Example 1.

The supporting member had a mean pore size of 10 μm, a diameter and a length of 150 mm and 1000 mm, respectively, a thickness of a partition wall of 2 mm, a width of the groove-shaped peripheral straight recess of 4 mm and a size of each side of a square of a liquid supply passage (cell) of 4 mm.

Subsequently, a slip was prepared as in Example 1. This slip for forming the filtration membrane was adsorbed to the surface of supply liquid passages of the supporting member of the honeycomb structure to form a (green) filtration membrane. The supporting member with the (green) filtration membrane thereon was then dried and sintered at 1250° C. The filtration membrane thus produced had a mean pore size of 0.2 μm.

The ceramic filter, produced in this manner, was fitted with end frames as shown in FIG. 6, and the pure water filtration flow rate at a differential pressure of 1 kg/cm$^2$ was measured and found to be 2.9 m$^3$/m$^2$ h.

Comparative Example 2

As shown in FIG. 4, a ceramic filter was produced in the same way as in Example 3 except not forming peripheral groove-shaped recesses in the supporting member of the honeycomb structure and not fitting the end frames on the ends of the supporting member. Namely, this produced the same filter as Comparative Example 3 and the result was the same.

Meritorious Effect of the Invention

The monolithic ceramic filter according to the present invention, generally, is of the honeycomb structure capable of being produced by extrusion molding and hence is compact and easy for industrial mass production, and may have its filtration area increased. In addition, according to the first aspect, by designing a part of the partition wall of the honeycomb structure as the flow resistance relaxing portion comprising a part of the partition wall of the honeycomb structure which is exposed with its end face on the outer wall surface of the honeycomb structure and which is larger in thickness than the remaining portion of the partition wall, the flow resistance presented to the filtrate within the partition wall is decreased, as shown by pure water transmission flow velocity data given in the above Examples, with the result that the filtration may be carried out efficiently. Besides, with the monolithic ceramic filter according to the first aspect of the present invention, the complicated production process of stopping up both ends of the filtrate discharging passages (cells) or the supply liquid passages may be eliminated to enable less costly manufacture.

According to the second aspect, the thick wall portion which constitutes the flow resistance relaxing portion has conduit openings for discharging the filtrate, and thus a still improved filtration rate is achieved.

The monolithic ceramic filter according to the third aspect of the present invention is compact in size and simple in the structure, and have an increased filtration area. In addition, since the filter includes communication voids separated from the cells of the honeycomb structure via cell partition walls and communicating with the outside of the honeycomb structure, the flow resistance presented to the filtrate within the partition walls (cell walls) is diminished, as shown by pure water filtration flow rate data of the illustrative Example, thus enabling the filtration to be performed efficiently. Besides, the monolithic ceramic filter of such a shape as to permit production thereof by extrusion molding, according to the third aspect, which can be produced at low costs because there is no necessity of boring openings for discharging the filtrate in the honeycomb structure.

According to the fourth aspect, the unit according to the third aspect can be assembled into a filter casing without difficulty and with an improved strength.

It should be noted that modifications apparent in the art can be made within the gist and concept of the invention as disclosed herein, without departing from the scope as claimed by the appended claims.

What is claimed is:

1. An extruded monolithic ceramic filter having an axial length, said monolithic ceramic filter comprising:

(a) an outer peripheral wall (i) extending along said axial length and (ii) enclosing said monolithic ceramic filter, and (b) a monolithic honeycomb structure within said outer peripheral wall, the honeycomb structure comprising cell passages along said axial length, a first partition wall and a second partition wall, the first partition wall (i) extending along said axial length of the honeycomb structure, and (ii) extending from an interior of the honeycomb structure towards said outer peripheral wall; and the second partition wall at least partially surrounding said cell passages;

wherein the first partition wall has an increased thickness compared to the second partition wall, wherein within the first partition wall there is at least one filtrate discharge conduit extending to the outer peripheral wall, and wherein the monolithic ceramic filter is produced by a single extrusion process.

2. The ceramic filter as defined in claim 1, wherein said first partition wall extends over the entire axial length of the honeycomb structure.

3. The ceramic filter as defined in claim 2, wherein said first partition wall comprises a plurality of wall portions of increased thickness which extend parallel to each other.

4. The ceramic filter as defined in 1, wherein said first partition wall comprises a plurality of wall portions of increased thickness which extend throughout, from one side to the other side of the honeycomb structure.

5. The ceramic filter as defined in claim 1, wherein the filtrate discharge conduit opening comprises bores extending transverse of the honeycomb structure.

6. The ceramic filter as defined in claim 5, wherein the said bores are disposed parallel to each other.

7. The ceramic filter as defined in claim 1, wherein said first partition wall has a thickness of about 2 to 5 times of the thickness of the second partition wall of the honeycomb structure.

8. The ceramic filter as defined in claim 1, wherein the honeycomb structure comprises a porous ceramic material and has a filtration membrane on a surface facing each of the cell passage of the honeycomb structure.

9. The ceramic filter as defined in claim 8, wherein an intermediate porous layer is disposed between the honeycomb structure and the filter membrane.

10. The ceramic filter as defined in claim 8, wherein said filter membrane is a porous ceramic having a smaller pore size than that of honeycomb structure.

11. A monolithic ceramic filter having an axial length, said monolithic ceramic filter comprising:

a monolithic honeycomb structure which comprises cell passages along said axial length and communication voids separated from said cell passages, said voids extending to and communicating with an outer peripheral wall over an entire axial length of the monolithic ceramic filter, said outer peripheral wall enclosing said monolithic ceramic filter and extending over the entire axial length thereof;

wherein the honeycomb structure has a shape having the same transverse cross section along a longitudinal axis of the honeycomb structure so as to permit production thereof solely by extrusion molding, wherein said communication voids extend from the outer peripheral wall toward an interior of the honeycomb structure, ending at an intermediate position between said outer peripheral wall and said longitudinal axis, and wherein said communication voids extend alternately from one side of the outer peripheral wall and from an opposite side of said outer peripheral wall as viewed in the cross section of the honeycomb structure.

* * * * *